(12) United States Patent
Sverdrup et al.

(10) Patent No.: US 9,529,191 B2
(45) Date of Patent: Dec. 27, 2016

(54) DYNAMIC FOVEAL VISION DISPLAY

(75) Inventors: Lawrence H. Sverdrup, Poway, CA (US); Mikhail Belenkii, San Diego, CA (US)

(73) Assignee: Trex Enterprises Corporation, San Diego, CA (US)

( * ) Notice: Subject to any disclaimer, the term of this patent is extended or adjusted under 35 U.S.C. 154(b) by 216 days.

(21) Appl. No.: 12/925,974

(22) Filed: Nov. 3, 2010

(65) Prior Publication Data
US 2012/0105310 A1 May 3, 2012

(51) Int. Cl.
*G02B 27/01* (2006.01)
*G02B 27/00* (2006.01)
*G09G 3/02* (2006.01)

(52) U.S. Cl.
CPC ......... *G02B 27/0093* (2013.01); *G02B 27/017* (2013.01); *G02B 27/0172* (2013.01); *G02B 2027/015* (2013.01); *G02B 2027/0123* (2013.01); *G02B 2027/0147* (2013.01); *G02B 2027/0187* (2013.01); *G09G 3/02* (2013.01)

(58) Field of Classification Search
USPC .............................. 345/7–8, 9; 359/630–633
See application file for complete search history.

(56) References Cited

U.S. PATENT DOCUMENTS

| | | | | |
|---|---|---|---|---|
| 5,430,505 A | * | 7/1995 | Katz | G02B 27/0093 |
| | | | | 351/205 |
| 6,008,781 A | * | 12/1999 | Furness, III | G02B 27/017 |
| | | | | 345/8 |
| 6,813,085 B2 | * | 11/2004 | Richards | 359/630 |
| 7,542,210 B2 | * | 6/2009 | Chirieleison, Sr. | 359/630 |
| 2009/0316115 A1 | * | 12/2009 | Itoh | G02B 27/0093 |
| | | | | 353/20 |
| 2012/0032875 A1 | * | 2/2012 | Sprowl et al. | 359/630 |

OTHER PUBLICATIONS

William F. Schonlau, Imevsive Viewing Engine Proc of SPIE vol. 6227 6224-OV-1, 2006.
William F. Schonlau, Personal Viewer, a wide field, low profile see-through eyeware display Proceedings of SPIE, vol. 5443, 2004.
Hakan Urey and Karlton D. Powell Microlens-array-based exit propel expander for full-color displays Applied Optics / vol. 44, No. 23 / Aug. 10, 2005.

\* cited by examiner

*Primary Examiner* — Robin Mishler
(74) *Attorney, Agent, or Firm* — John R. Ross

(57) ABSTRACT

A head mounted display system with at least one retinal display unit having a curved reflector positioned in front of one eye or both eyes of a wearer. The unit includes a first set of three modulated visible-light lasers co-aligned and adapted to provide a laser beam with selectable color and a first scanner unit providing both horizontal and vertical scanning of the laser beam across a portion of the curved reflector in directions so as to produce a reflection of the color laser beam through the pupil of the eye onto a portion of the retina large enough to encompass the fovea. The unit also includes a second set three modulated visible-light lasers plus an infrared laser, all lasers being co-aligned and adapted to provide a color and infrared peripheral view laser beam, and a second scanner unit providing both horizontal and vertical scanning of the visible light and infrared laser beams across a portion of the curved reflector in directions so as to produce a reflection of the scanned color and infrared laser beams through the pupil of the eye onto a portion of retina corresponding to a field of view of at least 30 degrees×30 degrees.

25 Claims, 15 Drawing Sheets

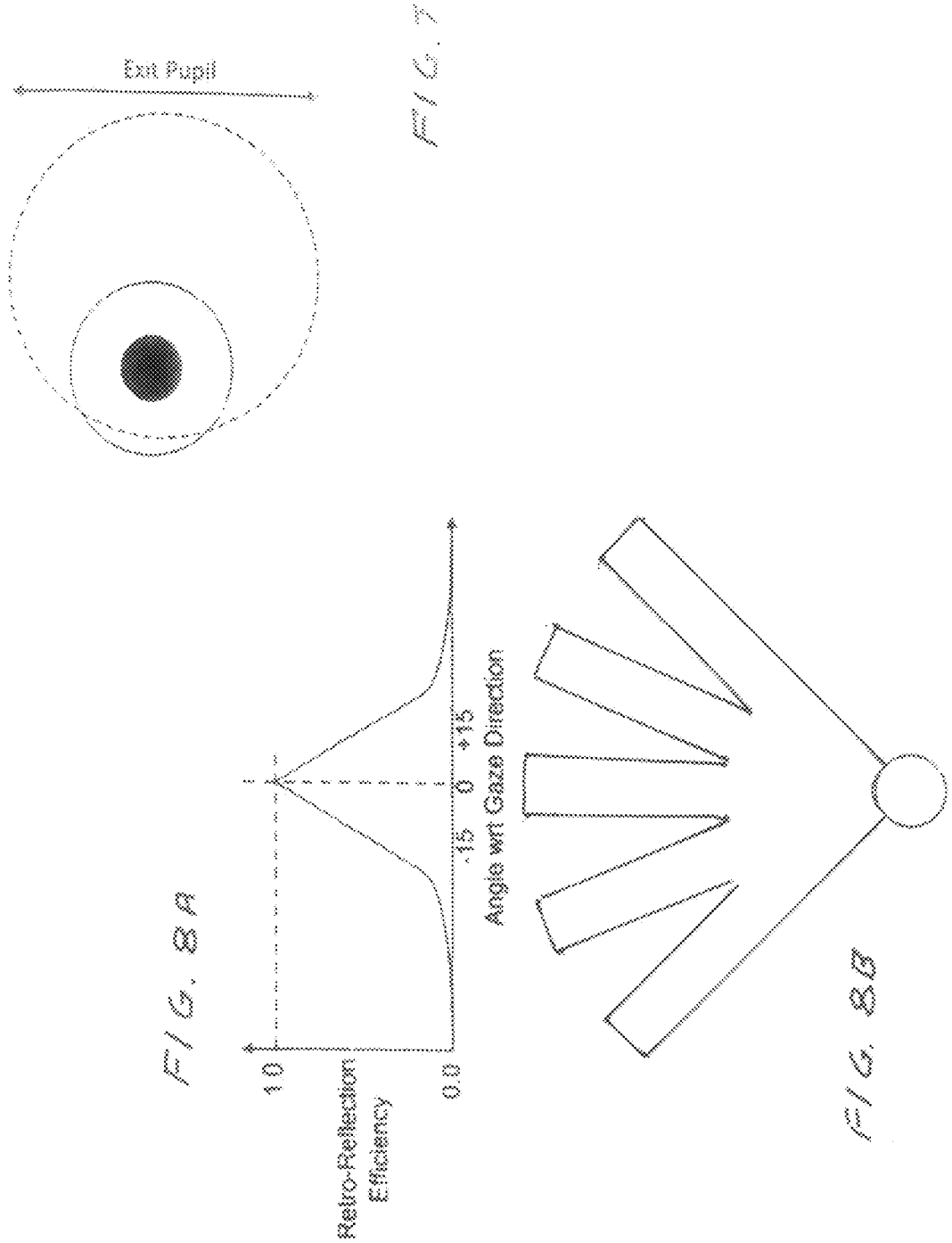

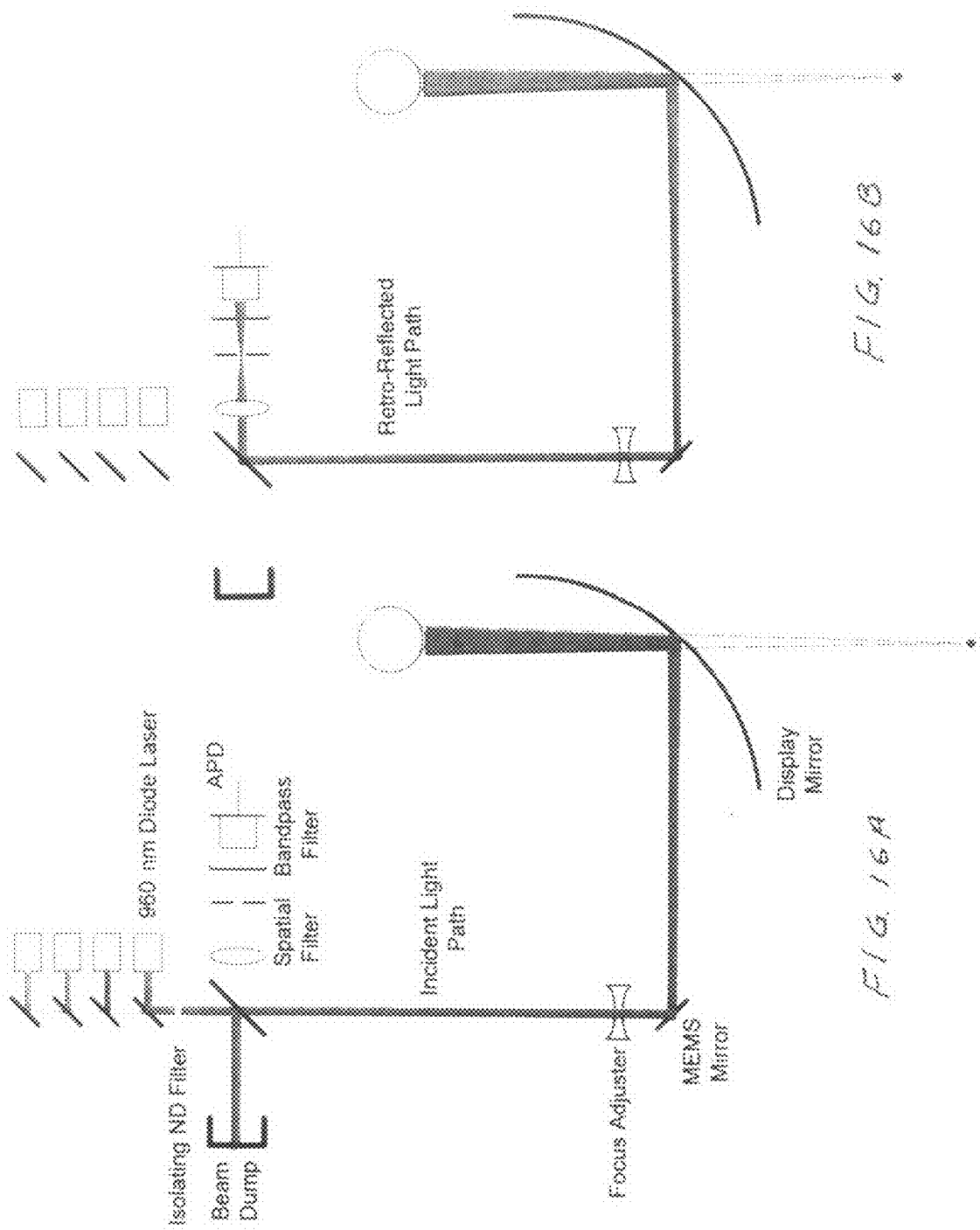

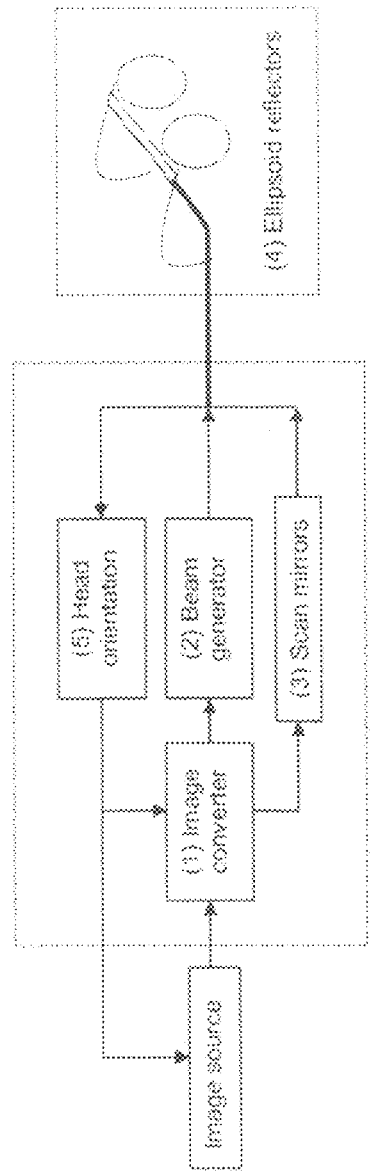
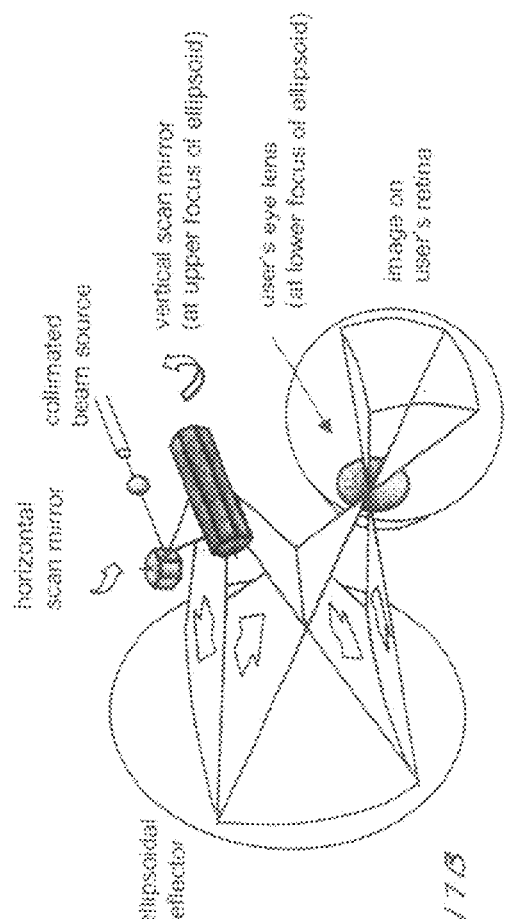
FIG. 17A
FIG. 17B

DYNAMIC FOVEAL VISION DISPLAY

FEDERALLY SPONSORED RESEARCH

This invention was made in the performance of a contract (Contract No. N68936-06-C-0051) with the Naval Air Systems Command (NAVAIR) and the United States Government has rights in the invention.

FIELD OF THE INVENTION

The present invention relates to head-mounted display systems and in particular to foveated head-mounted vision display systems.

BACKGROUND OF THE INVENTION

Head Mounted Displays

The most rapid transfer of information to humans is through vision. Head mounted displays are a modality of human-computer interface associated with vision. Head mounted display devices are well known. They are a small display device worn on the head sometimes as a part of a helmet. They may also be mounted on or be a part of a visor, goggles or eyeglasses. Head mounted displays can operate in either of two modes. In "augmented reality" mode the display is see-through, and the display imagery is superimposed upon natural vision. In "virtual reality" mode, the display is occluding and blocks the view of the local scenery, entirely replacing it with displayed imagery. The performance of current head mounted displays is limited compared to the typical human visual capability. Current head mounted display devices have serious ergonomic issues that significantly handicap the wearer. Examples of prior art designs for head mounted display devices includes a device with a goggle format proposed by William Schonlau and described in a SPIE paper, "Personal Viewer; a wide field, low profile, see-through eyewear display", SPIE Vol. 5443, 2004 and "Immersive Viewing Engine", SPIE Vol. 6224, 2006. This device is retinal scanning display based head mounted display with a curved primary mirror in front of the eye. FIG. 17A is a block diagram showing an overview of Schonlau's design and FIG. 17B is conceptual overview of the proposed prior art scan process.

Virtual Retinal Displays

Some head mounted displays are based on a technology referred to as "virtual retinal display" or "retinal scanning display". This is a technology that draws a raster display (like a television) directly onto the retina of the eye. The users see what appears to be a conventional display floating in space in front of them. This technology was invented by Kazuo Yoshinaka of Nippon Electric Company in 1986. Later work at the Human Interface Technology Laboratory at the University of Washington provided much smaller devices and these devices have been developed and marketed by Microvision, Inc. with headquarters in Redmond, Wash. FIG. 1A is a sketch showing a typical prior art virtual retinal display. It includes a video graphics array input, controlling electronics, one or more light sources, which are typically lasers, a light modulator, vertical and horizontal scanners and delivery optics. Light weight scanning systems are available utilizing two-dimensional MEMS scanners with at least one axis mechanically resonant. FIG. 1B shows two schematic views of such a device illustrating the two axes of motion. These devices are a few millimeters in size and replace the two larger scanning mirrors shown in FIG. 1A. In addition, it is now possible to directly modulate diode lasers with the required bandwidth, and an external laser modulator is not required. Laser-based scanning engines with direct diode laser modulation, and using 2D MEMS scanners are utilized in many modern display systems and are commercially available off-the-shelf. Some of these displays have laser outputs that are designed to be directed directly into the eye and are focused by the eye's optics directly onto the retina of the eye.

Prior Art Eye Tracking

Prior art methods of eye tracking are expensive, and insufficiently reliable. These prior art methods of eye-tracking typically image the pupil of the eye using an infrared light source and an additional camera to monitor infrared light reflected from the retina. Images from the extra camera are also used to locate glints from one or more infrared light emitting diodes. The best prior art desktop eye tracking systems typically have a reliability of between 85% and 90%. The 10%-15% rates of error become very annoying to users of gaze contingent displays. The processing power required to search for glints, determine the center of the pupil, and then calculate the gaze direction can be large and incompatible with the requirements for a portable head mounted display. Glints from objects illuminated by sunlight can interfere with the glints from the infrared light emitting diodes.

Limitations of Current Head Mounted Displays

Conventional head mounted displays have several serious limitations. Foremost is the tradeoff between spatial resolution and field-of-view. Conventional head mounted displays typically have both a limited field of view (20°-30°) and limited spatial resolution. The available pixels from some form of flat panel device must in general be spread uniformly over the desired field of view. The resolution is limited due to the finite pixel count and bandwidth restrictions. A very large pixel-count display (such as about 4200 pixels per dimension) would be required to provide both high-resolution (20/20 equivalent vision) and a field of view of 70°. Such a display does not to Applicants' knowledge exist in the prior art. The bandwidth required to deliver the required pixel information would present another set of difficulties involving size, weight and power consumption. Displays with even wider fields of view are desirable.

Another limitation of conventional head mounted displays is that they are typically heavy and bulky, often consisting of an optical system that might be described as a "stack of glass pancakes" especially for wide fields of view. Regardless of the display field of view provided, typically the see-through field of view is impeded. This is true, even if only a flat fold-mirror is placed in front of the eye. In conventional displays, see-through transmission is typically significantly impacted through the use of broadband partial reflectors, or holographic elements. For military applications, light leakage with partial reflectors or light scattering with holographic elements impact covertness, especially at night.

Yet another limitation of conventional head mounted displays is that they cannot properly display 3D imagery. In order to properly display 3D imagery, retinal disparity must exist appropriate to the depth of each object in the imagery, and in addition the focus of the object must agree with the depth. When these two depth cues fail to agree, the wearer will often suffer from what is known as simulator sickness. Typical head mounted displays have no provision for controlling the display focus or for making the display focus agree with real imagery in augmented reality mode.

SUMMARY OF THE INVENTION

The present invention overcomes the above limitations, and provides additional advantages over conventional head mounted displays. The present invention provides a virtual retinal display that is consistent with natural eye function. It provides high-resolution vision over a large field of view combined with low bandwidth requirements. The head mounted portion of the present invention is lightweight, compact and ergonomic. It can properly display 3D imagery.

Preferred embodiments of the present invention provide a head mounted display system with at least one retinal display unit having a curved reflector positioned in front of one eye or both eyes of a wearer. The unit includes a first set of three modulated visible-light lasers co-aligned and adapted to provide a laser beam with selectable color and a first scanner unit providing both horizontal and vertical scanning of the laser beam across a portion of the curved reflector in directions so as to produce a reflection of the color laser beam through the pupil of the eye onto a portion of the retina large enough to encompass the fovea. The unit also includes a second set three modulated visible-light lasers plus an infrared laser, all lasers being co-aligned and adapted to provide a color and infrared peripheral view laser beam, and a second scanner unit providing both horizontal and vertical scanning of the visible light and infrared laser beams across a portion of the curved reflector in directions so as to produce a reflection of the scanned color and infrared laser beams through the pupil of the eye onto a portion of retina corresponding to a field of view of at least 30 degrees×30 degrees. An infrared light detector detects infrared light reflected from the retina and subsequently the curved reflector and produces an infrared reflection signal which is used by control electronics to determine the current view direction of the eye. The unit also includes a video graphics input device providing color video graphics input signals. Based on the view direction of the eye and the video graphics input signals, the control electronics modulates the intensity of the components of both beams as they scan the curved reflector so as to direct the foveal beam onto a portion of the retina encompassing the fovea and to direct the peripheral view beam onto a portion of the retina corresponding to a field of view of at least 30 degrees×30 degrees.

As explained in the Background section, achieving both high resolution and a wide field of view simultaneously is very difficult in head mounted displays. If this was achieved by simply filling a large pixel count flat-panel array (e.g. liquid crystal displays or organic light emitting diode arrays) with high-resolution imagery, the computational power required to drive the display would be largely wasted because high-resolution is useful to the eye only in the foveal region where it is currently looking, and everywhere else only a reduced resolution is required. Applicants break up the displayed imagery into a high-resolution foveal component and reduced resolution peripheral component, and the wearer's eye obtains high-resolution imagery only where it is needed. In preferred embodiments, Applicants use an unconventional, robust and lightweight eye tracker to determine the gaze angle direction and generate a high resolution 20/20 visual zone covering the approximately 10° diameter field of view associated with the fovea (which Applicants refer to as the "foveal field of view" centered on where the user is currently looking), with a total field of view of 70° or more. The resolution is appropriately reduced in the peripheral vision. This greatly reduces the bandwidth requirements. Preferred embodiments are rugged, low-cost and provide high-resolution imagery.

Due to the use of retinal scanning display technology, the "pixels" of imagery are generated by laser beams entering the eye from an array of angles. The divergence of the laser beams as they enter the eye specifies the focus of the imagery. In a preferred embodiment a focus adjuster is incorporated to vary the divergence of the scanning laser beams, thereby controlling the focus of the imagery.

The key innovations of present invention include curved primary mirrors in front of the eyes that are lightweight and provide a large display field of view, and in augmented reality mode, a large unimpeded look-through field of view. Preferred embodiments utilize narrowband rugate reflective coatings in augmented reality mode to maximize transmission of light from the outside scenery, yet ensure that no significant amount of light can escape from the display. These preferred embodiments permit, for example, a soldier, pilot or surgeon to view live environments in augmented reality mode with a substantially unimpeded field of view and unimpeded transmission. The present invention includes an eye tracker that is simple and robust. Preferred embodiments utilize existing retinal scanning display hardware. Preferred embodiments use direct diode laser modulation and two-dimensional MEMS scanners to provide laser beams which are reflected from a curved mirror into the eye of the wearer so as to provide high resolution only where it is needed, and low resolution everywhere else. Preferred embodiments use a reverse "wavefront coding" concept to correct residual aberrations resulting from the use of the curved mirror. In one preferred embodiment, the curved mirror in front of the eye is spherical and the display field of view is 70°. In another preferred embodiment the mirror in front of the eye is ellipsoidal allowing for an extremely large display field of view such as 120 degrees. The eye is in some sense a megapixel device as the optic nerve contains approximately 1 million fibers. The MEMs-based laser scanning engines proposed for the present invention each have 0.92 megapixel capability. Since one scanner is utilized for foveal vision and one for peripheral vision, the information capacity of the proposed head mounted display rivals what the eye is capable of receiving.

BRIEF DESCRIPTION OF THE DRAWINGS

FIG. 7 depicts the purpose of an exit pupil expander in increasing the size of the eye box.

FIGS. 8A and 8B depict the basic mechanism of the eye-tracking which utilizes retro-reflection from the eye.

FIGS. 16A and 16B show a technique for adjusting the focus of the display to match actual view distances.

FIGS. 17A and 17B show features of a prior art retinal scanning system.

DETAILED DESCRIPTION OF PREFERRED EMBODIMENTS

Figure 1A:
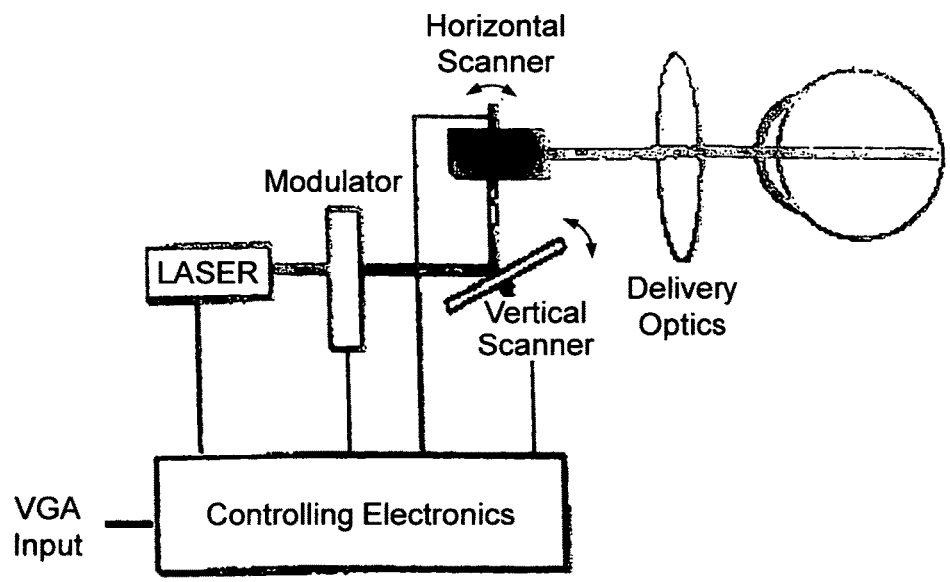
FIG. 1A is drawing describing features of a prior art retinal scanning system.
Figure 1B:
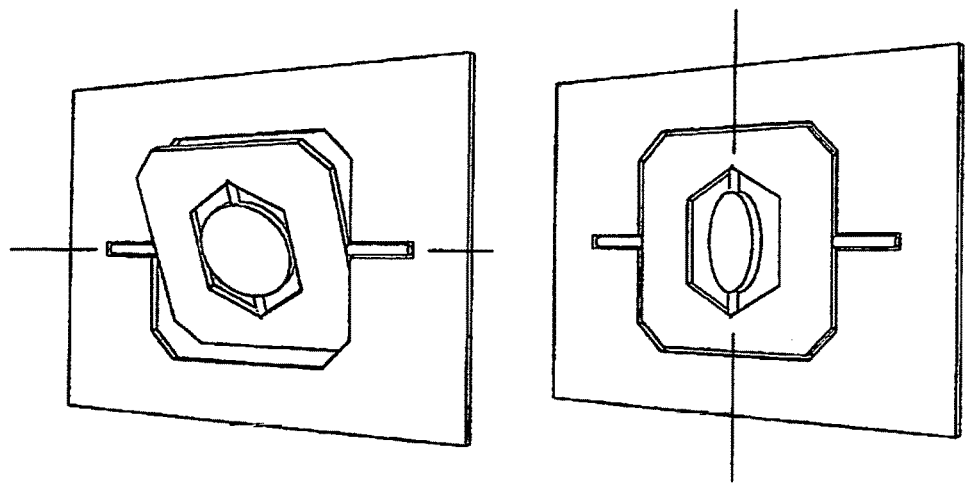
FIG. 1B is a drawing showing a prior art MEMS scanner.

Applicants' technology provides an ideal solution to the problems of prior art head mounted displays. Pixels are generated wherever and whenever they are needed in the field of view through judicious modulation of the lasers. The lasers are operated at high bandwidth over the foveal field of view where the wearer is currently looking, and operated at appropriately reduced bandwidth in the peripheral field of view. In this manner the wearer perceives high-resolution imagery wherever they look over a large field of view, yet the required bandwidth is manageable. Preferred embodiments can be described by reference to FIGS. 2A through 11. Applicants use two separate two dimensional MEMS scanner systems (each with a horizontal and vertical scan motion similar to the scanner shown in FIG. 1B). These scanners are available from suppliers such as Microvision, Inc. with offices in Redmond, Wash. One of the scanner systems produces the foveal high-resolution image, and a second scanning system produces the wide field of view peripheral image. A curved polycarbonate primary mirror in front of the eye is ergonomic, compact and lightweight. In preferred embodiments adapted for augmented reality modes the mirror reflects the laser light but also provides minimal reduction of see-through field of view in wrap around geometries and simultaneously provides maximum impact resistance. The display doubles as a form of eye protection. Diode lasers generate light with higher wall plug efficiency than any other technology, so the light generation is energy efficient. Optimum choice of the wavelengths utilized results in a color gamut that is impossible to obtain in any other manner and greatly exceeds that available from conventional displays. Brightness of the display in full sunlight is not a problem. The use of a dynamic focus adjuster for the laser beams allows for proper rendition of three-dimensional imagery. The use of narrowband rugate coatings for the primary mirror results in unsurpassed see-through transmission and negligible light leakage. If a flat fold mirror were utilized in front of the eye, then the laser beams would need to be collimated when viewing at infinity, and any leaked light would also be collimated. Instead, the use of a curved mirror ensures that any leakage of display light will be divergent (not collimated) and rapidly dissipate and become undetectable, ensuring covertness for applications requiring covert operation.

Figure 2A:
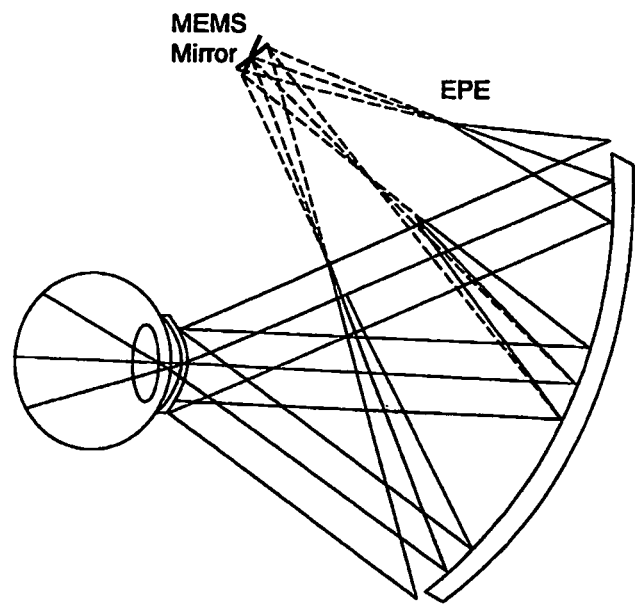
FIGS. 2A, 2B and 2C show features of a preferred embodiment of the present invention.
Figure 2B:
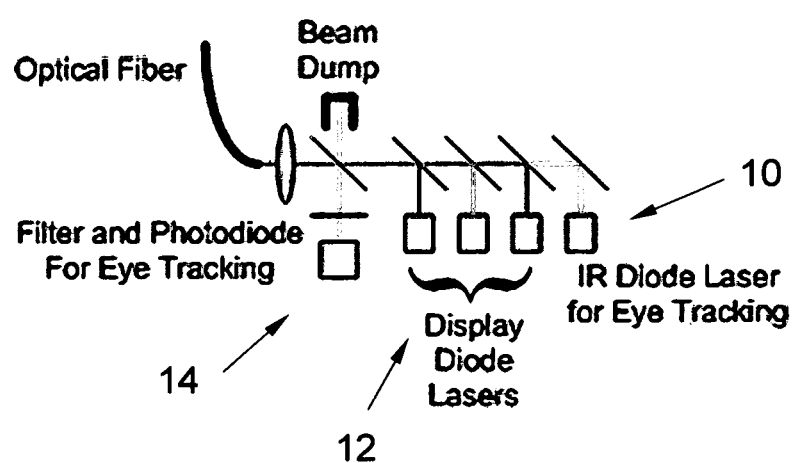

The use of a curved mirror requires a method to correct for the optical aberrations inherent in its use. The laser supported retinal scanning technology dovetails with the use of a curved mirror in that the high effective f-number of the laser beams dramatically reduces the aberrations induced by the curved mirror. In fact, without the laser scanning technology, the use of a curved primary mirror is probably not feasible. Even with the laser scanning, there are residual aberrations that could adversely affect resolution at larger field angles. To remove these residual aberrations in preferred embodiments, Applicants utilize a novel wavefront coding technology to correct in software for the aberrations before the images are displayed. Applicants' foveation technique requires a robust form of eye-tracking. Conventional eye-trackers are expensive, bulky and encounter problems functioning in bright sunlight due to interference. Worse, they are not as robust as is desired. Gaze-contingent displays become very annoying when the eye-tracking fails. As shown in FIG. 2B, Applicants add to the peripheral field of view scanner an infrared laser 10 in addition to the colored laser stack 12 of red, green and blue lasers. An avalanche photodiode 14 also incorporated into the laser housing records and maps the "red-eye" retro-reflection from the eye. The retro-reflection pattern is essentially a cone of 20° full-width half-maximum in angular space centered on the gaze direction, with some small constant offset that is determined during a calibration step. Every time the display image updates, the current gaze direction is robustly determined, and the high-resolution portion of the displayed image is moved to be coincident with the gaze direction. Very little extra hardware is required, permitting the device to remain compact and lightweight. Because the gaze direction is determined using the scanning display system beam path, there is no chance of losing registration.

Basic Architecture of the Present Invention

Figure 2C:
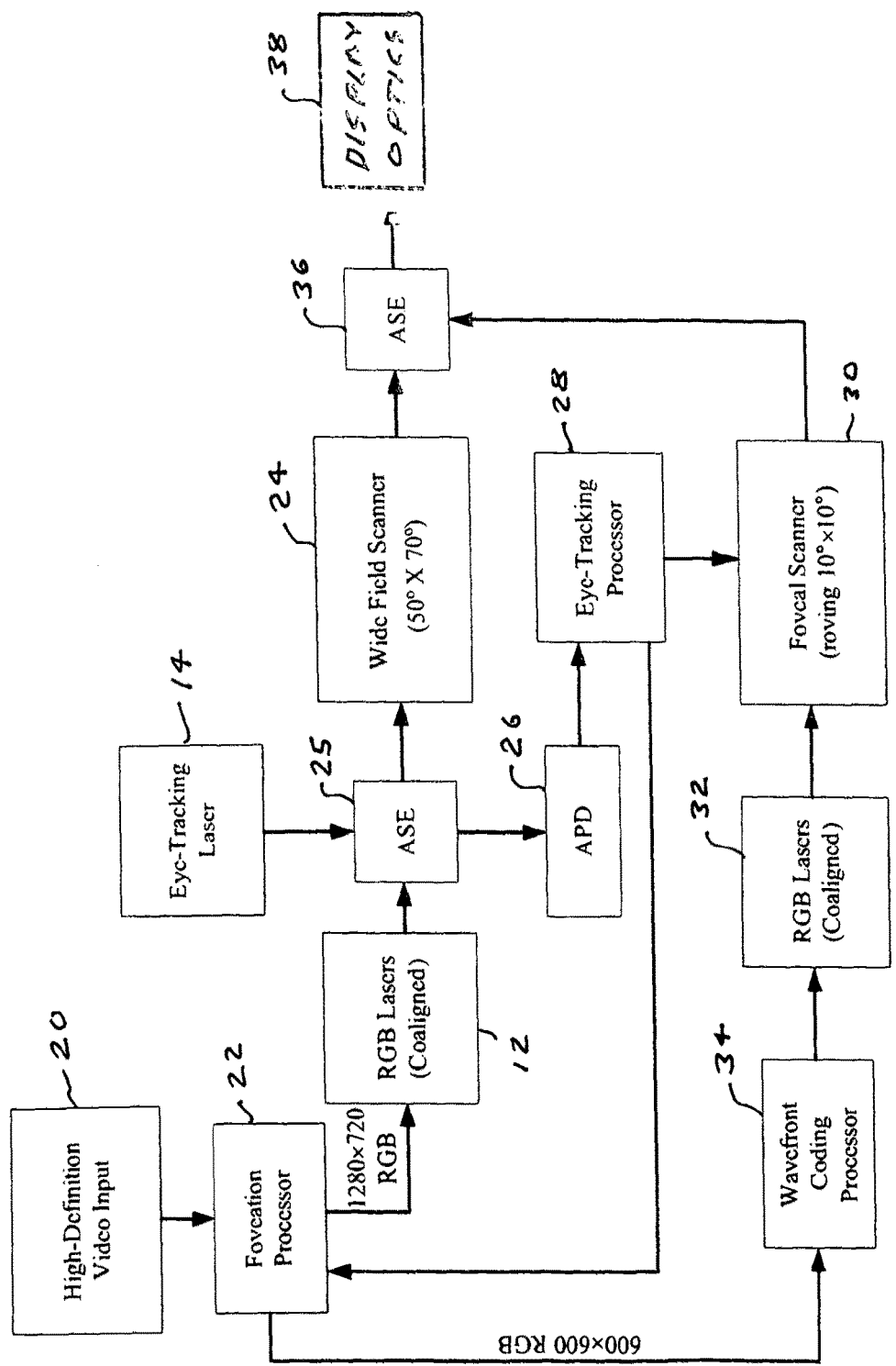

Preferred embodiments of the present invention are based on direct writing to the retina of the user's eye, using laser beams and MEMS scanners. This approach in conjunction with the curved polycarbonate primary mirror permits a reduction in size, weight and power requirements for a head mounted display while achieving high resolution (20/20 vision) and a large field of view (50°×70°). A 10° diameter foveal high-resolution zone is generated in the gaze direction where the user is currently looking. A lower-resolution peripheral image is generated in the remainder of the field of view. FIG. 2C is a block diagram showing the principal elements of a prototype system designed by Applicants. It includes a high definition video input 20 and a foveation processor 22 for determining the portion of the video input to display using the foveal scanner 30. The system also includes a first set of co-aligned red, green and blue lasers 12 to provide full color images and an eye tracking infrared laser 14 (also co-aligned with the visible lasers) furnishing a light beam for the wide field scanner 24 via a first aperture sharing element (ASE) 25. The gaze direction is monitored by an unconventional robust lightweight eye-tracker including an avalanche photodiode (APD) 26 and an eye-tracking processor 28. The eye-tracking processor 28 controls a foveal scanner 30 which receives illumination from a second set of co-aligned red, green and blue lasers 32 which are controlled by wavefront coding processor 34. The wavefront coding processor is described in detail below. The two scanned beams from the wide field scanner 24 and the foveal scanner 30 are combined in a second aperture sharing element 36 and directed to display optics 38 where the combined beam is directed into the user's eye. Applicants' system when designed for an augmented reality application has the following advantages as compared to conventional head mounted displays: full color, wide display field of view and high resolution, occluded or non-occluded modes, unimpeded natural field of view, see-through transmission exceeds 80%, high brightness adequate for operation in full sunlight, tolerant to slippage, lightweight (25 grams/eye) for the head-mounted portion, low power (a few watts), negligible leakage to the outside environment and eye protection from impact and external laser sources. Applicants' prototype version is mounted directly on the face similar to a pair of aviation or safety goggles. A schematic and overall architecture are shown in FIG. 2A-C.

Laser Displays are Safe

Some lasers are potentially dangerous to the eye only because they are bright sources of light, meaning that they are capable of being focused to a small spot on the retina, dramatically increasing the power per unit area or flux. Damage can result if the flux delivered to the retina is too high. However, any source of light can cause damage if the optical flux produced at the retina is too large. In an imaging system, higher resolution is directly associated with the capability of the system to produce smaller spot size on the retina. It is frequently the goal of the designer of a display system to produce the smallest possible spot size. Lasers are ideal for imaging applications because they are particularly good at being focused to small spot diameters. Safety depends upon controlling the flux delivered to the retina, as for any other source of light. There are two categories of commercial products that direct a laser beam into the eye. In the first category direction of the laser beam into the eye is intentional and in the second category the direction is not intentional but is nevertheless safe. The first category includes wavefront aberrometers, retinal scanners and laser scanning ophthalmoscopes. The second category includes supermarket checkout scanners and laser radar for measuring automobile speed. In all of these commercial products, safety is ensured by controlling and limiting the maximum flux delivered to any spot on the retina. Typical retinal display engines utilize laser powers on the order of hundreds of nano-watts and are unconditionally eye safe. Preferred embodiments of the display described herein include a safety sub-system that turns off the lasers in case of a scanner fault and/or a modulation fault. Other embodiments utilize lasers which can be safely directed into the eye such as ANSI Class 1 lasers, so that even if there is a scanner or modulation fault, and even if in addition the safety sub-systems fail, the eye is at absolutely no risk of damage.

Reverse Wavefront Coding

Virtual retinal displays using curved primary mirrors were previously thought impossible due to the difficulty in controlling the aberrations introduced by the curved mirror. However the advantages of a curved primary mirror are considerable, including a compact and lightweight design, potentially immense display field of view, and a substantially unimpeded look-through field of view. Virtual retinal display technology utilized by Applicants dramatically reduces the aberrations induced by the curved mirror by reducing the area of the mirror used to generate each pixel (to approximately a beam diameter).

Reverse "wavefront coding" is a technology that can eliminate substantially all of the remaining aberrations and provide for high resolution at all field angles. The point spread function describes the response of an imaging system to a point source of light, such as a star. Aberrations in an optical system such as the optical system shown in FIG. 2C (without the wavefront coding) in general distort the image by creating a larger and/or less symmetrical point spread function. The basic process of wavefront coding involves two steps:

(1) First Applicants place a phase plate in the optical system that essentially determines a constant system point spread function despite additional aberrations from the optical system itself, which vary with field angle. That phase plate aberrations exist with this property comprises the essential "magic" of wavefront coding techniques. Typically, a wave plate with a third-order aberration involving coma and trefoil is used, although other aberrations types have also been found to work. Defocus, astigmatism and spherical aberration added by the optical system will have negligible impact on the point spread function in the presence of the third-order phase plate aberration provided that their collective amounts are less than the amount of third-order phase plate aberration as measured by root mean square wave front error. Figuratively speaking, the third-order aberrations dominate the profile of the point spread function.

(2) The second process is to in software de-convolute from the images the known and constant point spread function due to the wave plate prior to display. Upon subsequent display, the de-convoluted image is re-convoluted in hardware with the third-order aberrations. The net effect is to restore the images to near pristine quality removing the effects of the optical system aberrations.

One penalty for utilizing such a technique is that there is added power consumption to perform the required de-convolution image processing. However, modern image processing chips are compact, energy efficient, powerful and affordable. This is an example of a hybrid optical-electronic system.

Traditionally wavefront coding is used to increase depth of focus of an imaging device such as a microscope or cell phone camera. In these applications the image is de-convoluted in software after capture with an imaging system that includes a third-order wave plate. In the current scheme, the image is de-convoluted in software prior to display using hardware that includes the third-order wave plate. The Applicants refer to this as "reverse" wavefront coding.

As indicated above wavefront coding preferably requires that the phase plate aberrations are larger than or equal to the aberrations due to the optical system. If this is not the case, then the point spread function will begin to be affected by the hardware aberrations, and the technique will have reduced effectiveness. The known phase plate aberrations are eliminated by de-convolution in software. The typical wavefront coding tradeoff is that some excess signal-to-noise ratio is consumed in the process. In the particular case of the present invention, the point spread function determined by the phase plate is de-convoluted from the images prior to their display. The display will then, in hardware, convolute the de-convoluted image with the known point spread function producing a much improved image for the eye. In this manner the difficult and varying aberrations due to the use of a curved mirror in front of the eye are circumvented. High resolution is possible for all field angles. Applicants have performed simulations of wavefront coding to correct for various combinations of added aberrations.

Figure 3A:
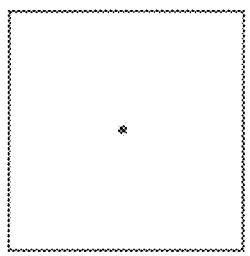
FIGS. 3A-3D illustrate how wavefront coding is utilized for the correction of optical system aberrations.
Figure 3B:
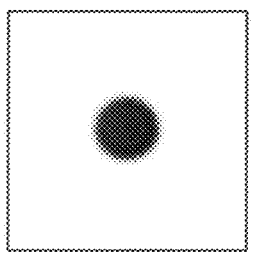
Figure 3C:
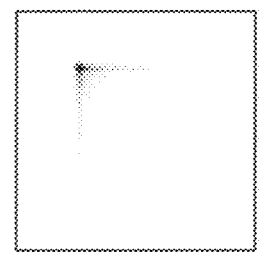
Figure 3D:
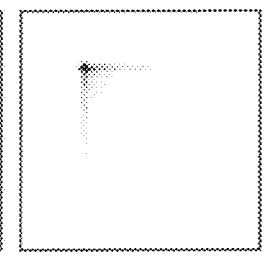
Figure 4:
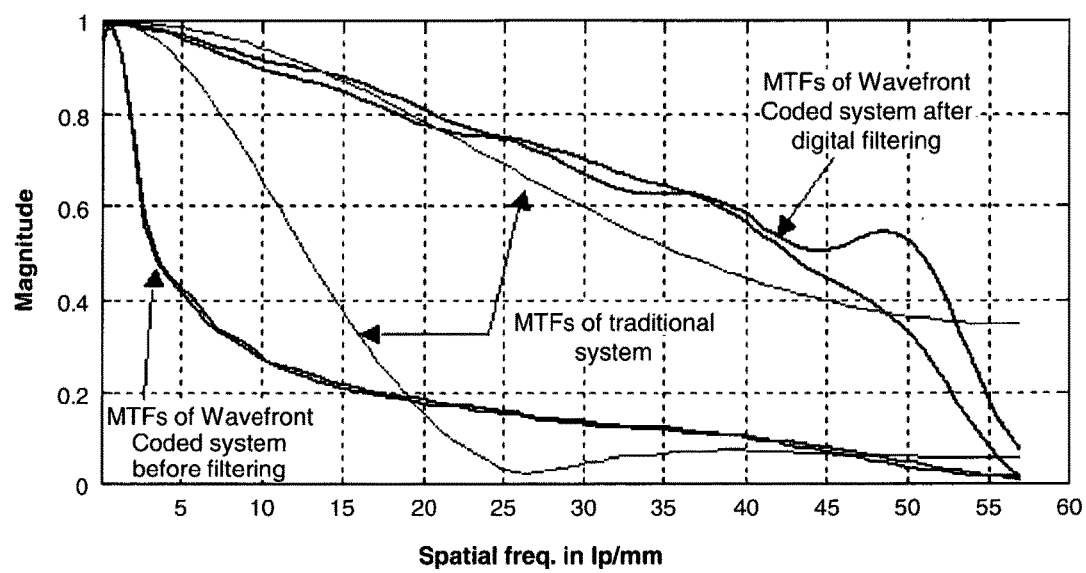
FIG. 4 is from a prior art paper and is a plot of the modulation transfer function versus spatial frequency of an optical system with and without wavefront coding and with and without an added defocus aberration.

The basic process of wavefront coding is described in FIGS. 3A, B, C and D and FIG. 4. FIGS. 3A-3D and FIG. 4 are from a SPIE paper: "Wavefront Coding: A modern method of achieving high performance and/or low cost imaging systems", E. Dowski and G. Johnson, SPIE Vol 3779 (1999) pages 137-145. FIG. 3A depicts the point spread function of an ideal diffraction-limited optical system. FIG. 3C shows the point spread function of a diffraction-limited system in the presence of the third-order aberrations intentionally added for purposes of wavefront coding. FIG. 3B shows the point spread function for an optical system in the presence of a significant amount of defocus aberration. Of note here is that the smearing due to the defocus is isotropic and severe. FIG. 3D shows the point spread function of an optical system containing both the defocus of FIG. 3B and the third-order aberration of FIG. 3C. One important point is that the severe isotropic smearing implied in FIG. 3B has been removed. A second important point is that there is no detectable difference between the point spread functions shown in FIG. 3C and that shown in FIG. 3D. Therefore, if the point spread function shown in FIG. 3C is de-convoluted from the optical system of FIG. 3D, not only will the effects of the third-order aberration be removed, but also the effects of the defocus shown in FIG. 3B will be removed as well. Hence the effects of varying amounts of aberrations can be removed with the technique of wavefront coding. The modulation transfer function of an optical system is a measure of the quality of an image created by the system. FIG. 4 is a graph showing the results of the use of wavefront coding to correct aberrations such as those resulting from the use of curved mirrors in virtual retinal displays. There are three sets of two curves. Each set of two shows the modulation transfer function with and without an added defocus aberration. The thick curves are the modulation transfer function of an optical system without added defocus (upper curve) and with added defocus (lower curve). Adding defocus depresses the modulation transfer function, destroying the quality of any image made with the optical system. At certain spatial frequencies, the depression is almost to the baseline meaning that there is little or no recoverable information at that spatial frequency. The lower two thin curves (one with added defocus, the other without added defocus) are the modulation transfer function of the same optical system with an added third-order aberration for purposes of wavefront coding. As can be seen, the addition of the defocus does not further degrade the modulation transfer function in the presence of the third-order aberration. In addition, the MTF curve in the presence of the added defocus is not driven to the baseline at certain spatial frequencies, as for the case with added defocus alone, and the image information is recoverable. The upper two thin curves are the after de-convolution of the added third-order aberration. There is little difference between the curve with added defocus, and the curve without the defocus. Hence the wavefront coded system is immune to the effects of the amount of added defocus. Furthermore, the modulation transfer function of the wavefront coded system actually exceeds that of the base optical system without wavefront coding at many spatial frequencies.

The processing power requirements and associated power consumption to handle the needed calculations have been investigated and Applicants have determined that currently available processors can provide the required computations and corrections in real time using compact and portable electronic processors. Ophthonix, Inc with offices in Vista, Calif. has developed a technology to manufacture highly accurate phase plates containing arbitrary phase patterns, as required for wavefront coding. Use of an electrically addressable spatial light modulator to provide the wavefront coding phase pattern would enable one to turn off the wavefront coding so as to conserve the processing power when high resolution imagery is not needed. In addition, such an electrically addressable spatial light modulator could double as the variable focus element.

Exit Pupil Expansion

All head mounted displays illuminate an area of the face known as the "eye box" located at the exit pupil of the display system as schematically shown in FIG. 7. If the eye is in the eye box, the displayed image will be visible. If the eye is outside the eye box, the displayed image will not be visible. It is desirable to have the eye box large enough that the head mounted display can be easily adjusted to place the eye in the eye box. It is also desirable to have the eye remain inside the eye box despite relative movements of the display and face due to anticipated activities. One advantage of the face-mounted goggle version of the present invention is that relative motion between the head mounted display and the face is anticipated to be relatively small despite rigorous activity of the wearer. Therefore the size of the eye box can be considerably smaller as compared to the helmet-mounted version. A smaller eye box means that less light is wasted illuminating the face adjacent to the eye, and simultaneously the amount of possible light leakage that could theoretically compromise covertness in military applications is also reduced.

Figure 5:
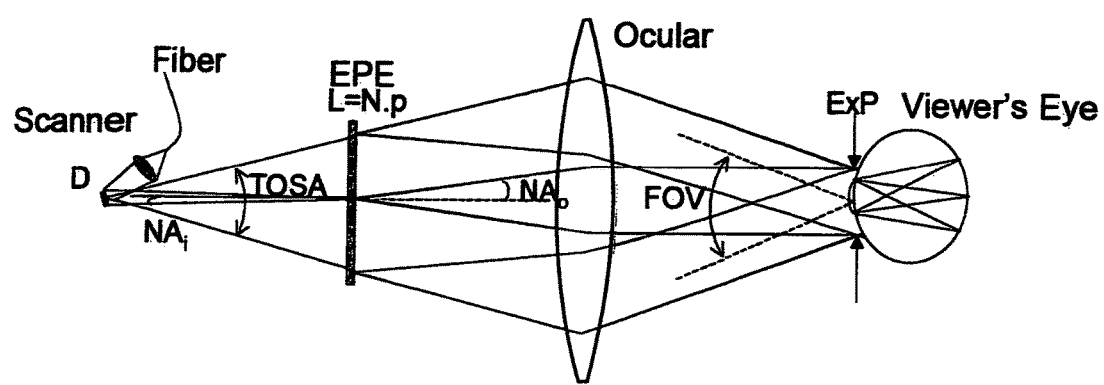
FIGS. 5, 6A, 6B, 6C, and 6D are prior art drawings showing features of exit pupil expanders.
Figure 6D:
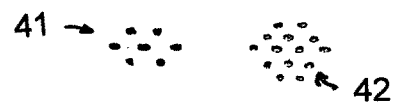
Figure 6C:
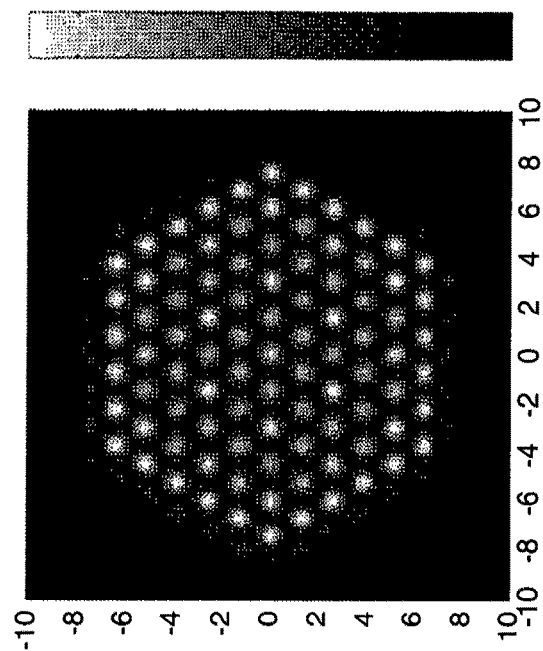
Figure 6B:
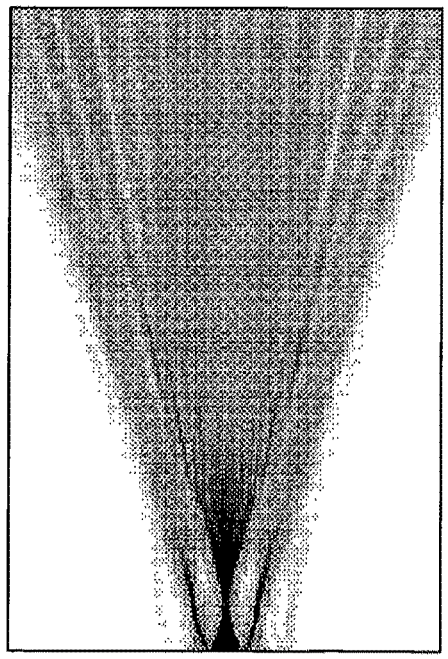
Figure 6A:
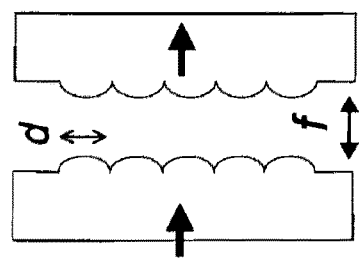
Figure 11:
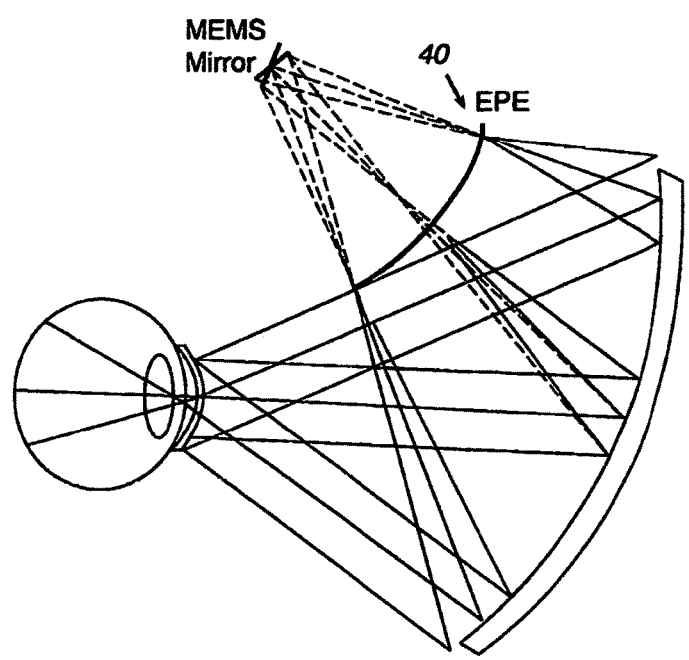
FIG. 11 demonstrates how applicants utilize an exit pupil expander to assure that at least one laser beam enters the wearer's pupil.

FIGS. 5, 6A, B and C, 7 and 11 schematically illustrate the concept of exit pupil expander (EPE) 40 utilized to expand the size of the eye box at the exit pupil. FIGS. 5, 6A, 6B and 6C are from a SPIE paper: "Microlens array-based exit pupil expander for full color display applications", H. Urey and K. Powell, Proceedings of the SPIE volume 5456, April 2004, and earlier publications referenced therein. The device takes a relatively narrow beam from the scanner, and in combination with the final imaging optic, creates numerous parallel beams to increase the size of the eye box. Details of the function are shown in FIGS. 6A, B, C and D. This existing technology simply requires a design with parameters appropriate to the new proposed device. Preferred embodiments of the present device utilize an exit pupil expander as shown at 40 in FIGS. 5 and 11. The prior art Microvision Micro-Lens-Array Exit-Pupil-Expander (MLA-EPE) is a refractive diffractive hybrid optic that expands the exit pupil for all wavelengths equally. The exit pupil expander may be flat or curved. A curved exit pupil expander, as shown in FIG. 11, would reduce the field-dependant aberration components significantly. However, curved is significantly more difficult to fabricate; the stronger the curvature the more difficult the fabrication. A flat exit pupil expander would be easy to fabricate but creates larger field-dependent aberrations. An exit pupil expander is made up of two precisely aligned lenslet arrays as shown schematically in FIG. 6A.

The pupil of a human eye has a diameter that varies from 2 mm to 8 mm but is typically about 3 mm in conditions of good illumination. The exit pupil expander basically converts one input beam into a large array of parallel beams that are spaced apart into a hexagonal array. It is important that at least one beam of the array of beams enter the pupil. In the exit pupil expander shown in FIGS. 6A, B and C (which is designed for a helmet mounted display), a single narrow beam is converted into 91 parallel beams distributed over an aperture roughly 15 mm in diameter. The distance between adjacent beams is of the order of 1.5 mm. This assures that at least one but more typically several beams will enter a 3 mm pupil with each pulse of light from the stacked lasers provided that the pupil is located somewhere in the pattern of beams. For the goggle mounted display the pattern of spots would preferably be much smaller. Preferred patterns would include seven or fourteen parallel beams as shown at 41 and 42 in FIG. 6D.

To begin the fabrication task, each lenslet array begins with a mask that is used to etch the lenslet shape into a master tool. The master tool is then used to replicate the lenslets in epoxy onto appropriately shaped substrates. Each lenslet array generally has its own pitch and depth and therefore requires its own mask and master. Once fabricated, the two lenslet arrays are precisely aligned to each other and bonded. For the flat exit pupil expander, field flattening lenses will be fabricated and bonded to the exterior of the exit pupil expander to appropriately accommodate the incoming and outgoing beams. The fabrication of the curved exit pupil expander requires a few additional steps if the mask and master are flat. The epoxy lenslet array is made on a flat surrogate substrate and is much thicker. It is then removed from this substrate and placed on a curved substrate.

Novel Eye Tracking Scheme

Figure 9B:
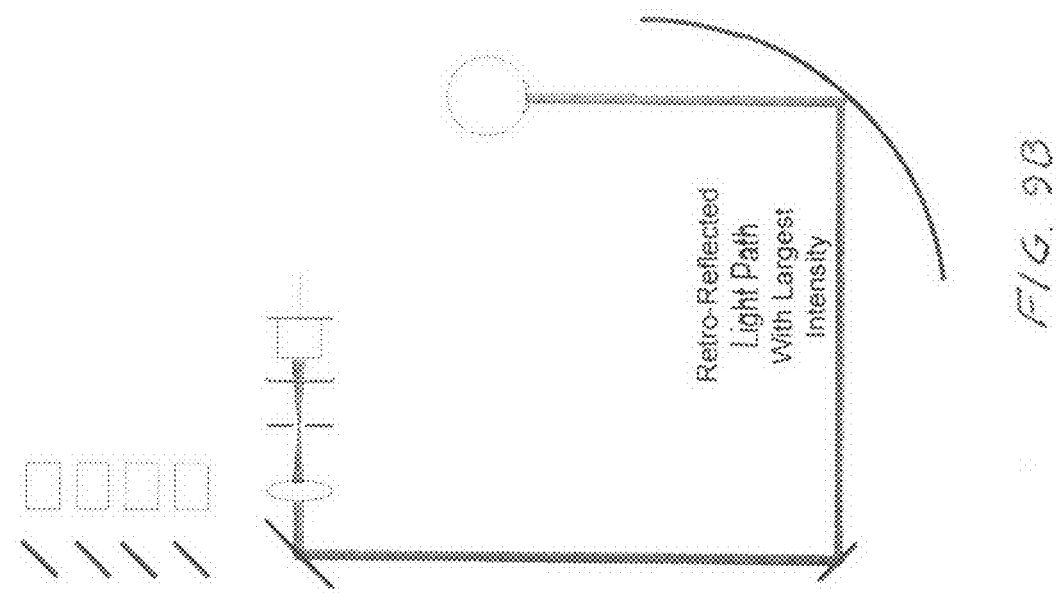
FIGS. 9A and 9B depict a system view of the eye-tracking based upon retro-reflection from the eye.
Figure 9A:
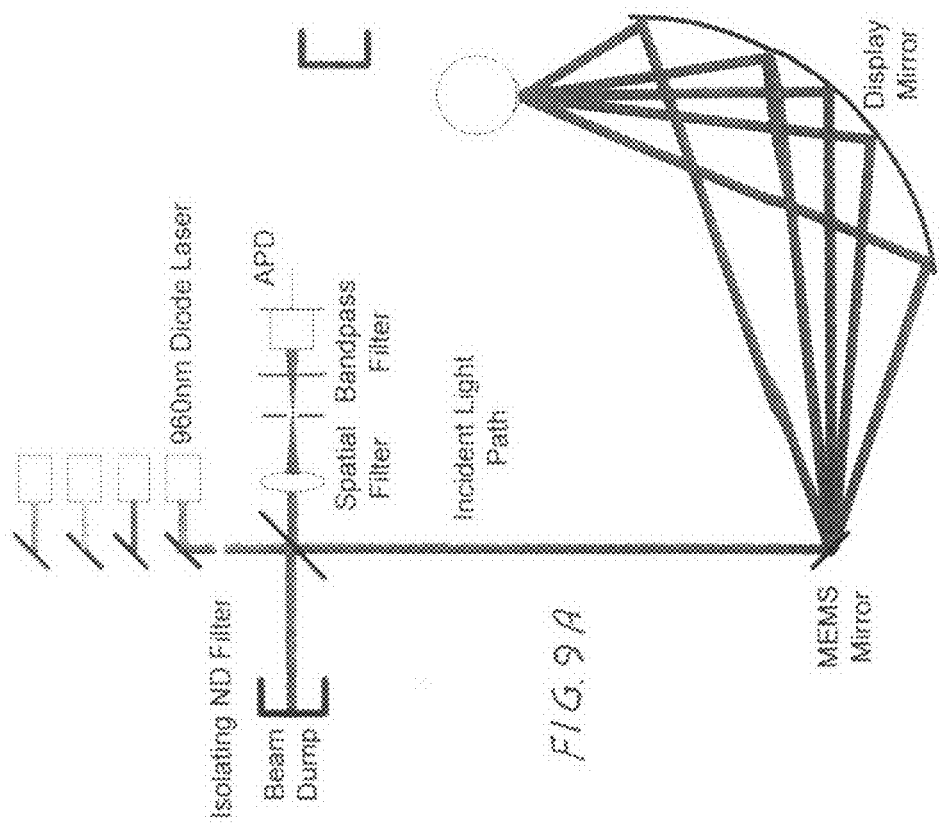

A portion of light incident upon the eye is retro-reflected. Retro-reflection is a generic feature of all imaging systems that employ a detector at the focus of a lens. For the human eye that detector is the retina. Photographer's red-eye reflection is an example. A technique utilized in photography is that in order to avoid the red eye retro-reflection, the flash and camera should be separated by at least 3 degrees, because the retro-reflection from the eye is fairly narrow. Optical calculations using a simple eye model indicate that the efficiency of retro-reflection varies with incident field angle fairly dramatically due to light trapping behind the iris as shown in FIG. 8A. A calculation of this effect has been presented in an unpublished paper by C. E. Mungan at the U. S. Naval Academy entitled "The Cat's Eye Retroreflector" available at http://www.usna.edu/Users/physics/mungan/Scholarship/scholarship.html. Consequently, if one probes the eye with beams of light from all directions (FIG. 8B), the amount of retro-reflection will peak in the gaze direction and will fall off fairly dramatically away from the gaze direction. In order to produce an image in focus at infinity, the present invention generates beams of collimated light directed toward the eye from a dense array of angles filling the display field of view. The beams are produced by red, green and blue lasers that are appropriately modulated. With the addition of an infrared laser that is not visible and an avalanche photo-diode to look for retro-reflected infrared light, the retro-reflection magnitude is mapped over the field of view to determine the angular location of peak retro-reflection, which is the gaze direction (with some constant offset determined in a calibration step). Thus the gaze direction will be determined at the display frame rate, which is at least 60 frames per second. FIGS. 9A and 9B depict the eye tracker system concept. Advantages of this scheme include the fact that little extra hardware is required, and the tracking is quite robust. In addition, since the gaze direction is determined using the display hardware, there are no registration errors. Robustness in ensured because the conical pattern of retro-reflection centered on the gaze direction is broad in angle and encompasses a substantial proportion of the display pixels. The amount of redundant data specifying the conical pattern is very large. Errors on a few pixels, whatever the cause, cannot alter the overall pattern.

Foveation to Achieve High Resolution

High resolution in a display with a wide field of view is achieved by creating a foveated display. A high resolution image is displayed covering a roving 10°×10° zone centered on the current gaze direction, and an image with reduced resolution is displayed over the remainder of the field of view. A resolution of 1 arc-minute (equal to $\frac{1}{60}$ of one degree) is required for 20/20 vision (the 20/20 "E" is 5 arc minutes tall). Therefore the 10°×10° foveal zone requires of the order of 600×600 pixels to provide 20/20 caliber resolution. This is similar to the number of pixels in a video graphics array (VGA) (640×480) device or a wide video graphics array (WVGA) (848×480) device. The number of fibers in the human optic nerve has been counted, and the answer is slightly over 1 million fibers (F S Mikelberg et al., The normal human optic nerve: Axon count and axon diameter distribution, Ophthalmology, 96(9) 1989, pp 1325-8). In this sense, the entire human eye (foveal plus peripheral vision) is roughly a megapixel device. If the 10°×10° foveal zone utilizes 600×600=$3.6 \times 10^5$ pixels, then the peripheral vision would account for the remainder or $6.4 \times 10^5$ pixels. These are rough estimates. The acuity of the young adult eye is actually better than 20/20 (i.e. about 20/13.5 on average). In addition the peripheral eye performs local calculations before transmitting data to the brain. However, the above numbers act as a guide to what might be useful for a display to provide in terms of information content.

Resolution in a laser scanning display is controlled by two factors. Vertical resolution is controlled by the angular density of horizontal scan lines. Horizontal resolution is controlled by the minimum laser pulse duration in combination with the angular scan speed. To avoid the phenomena of flicker, the frame rate should be at least 60 per second. Therefore the frame rate cannot be reduced arbitrarily to increase resolution.

If an available scanner has sufficient resolution to generate the desired foveal resolution anywhere in the field of view when the pixels are uniformly distributed over the entire field of view of the display, then only one such scanner is required per eye. In this case, resolution and average bandwidth are controlled by modulation of the laser beams. The laser beams are modulated at a high rate for a high pixel count in the foveal zone, and modulated at reduced rate for a much lower pixel count in the remainder of the field of view. In this manner, the average number of effective pixels is modest despite the generation of high resolution imagery everywhere the wearer looks over a large field of view. Retinal scanning display technology is steadily improving, and retinal scanners with very large effective pixel counts are expected to be available in the next few years. Microvision's current wide video graphics arrays scanners offers 480×848 pixels. Scanners providing additional pixels are expected in the near future.

For 20/20 caliber foveal vision and a total field of view comprising 50°×70°, the required effective pixel count from a single scanner is 3000×4200. Current high definition (HD) TV displays are only 1080×1920 pixels so the requirement represents an advanced technology. To achieve foveation in this case, the Applicants utilize two scanner systems combined using a beam splitter. One scanner generates the peripheral vision scene and may also be used to generate a portion of the foveal scene resolution. The other scanner generates the foveal scene or the remainder of the foveal scene if the task is shared with the peripheral scanner. The foveal scanner is operated in a novel fashion.

Figure 10:
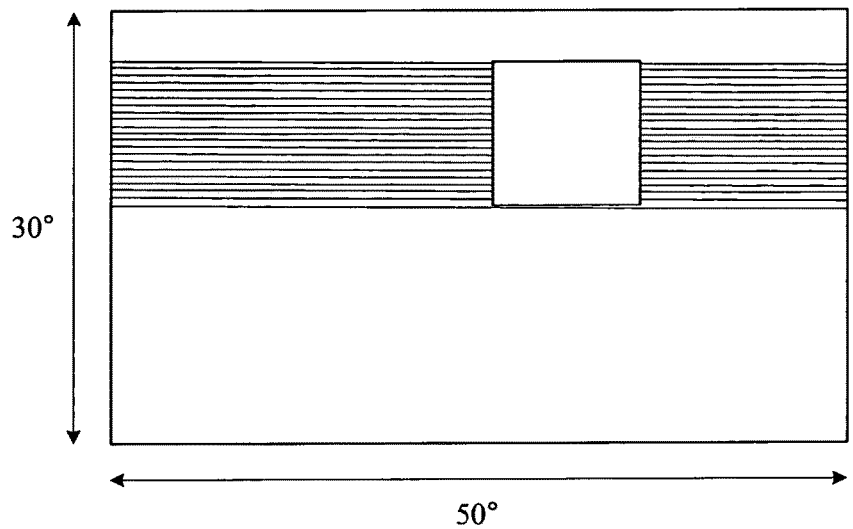
FIG. 10 shows an important feature of the present invention that provides an increased pixel density and thus higher display resolution in the foveal portion of a wearer's field of view.

Microvision prior art scanners utilize resonant scanning in the horizontal direction to conserve power. The vertical direction is driven by a ramping voltage applied to the other axis of the MEMS mirror. In preferred embodiments the horizontal axis always makes full scans resonantly as it is designed for. The vertical ramp, however, is not over the full field of view, but instead only over a vertical range of 10° centered on the current vertical position of the foveal gaze, as shown in FIG. 10. The vertical position of the foveal zone is adjusted by moving the scanned zone up and down within the total field of view to match the current gaze angle. The horizontal position of the foveal zone is adjusted via timing of the laser pulses so that the laser pulses are produced only when the scanner is directing pulses to the foveal zone. By scanning over 10° instead of the full vertical field of view, the density of horizontal lines is increased proportionally, thereby increasing the resolution. If the foveal scanner lines are interlaced appropriately with the peripheral scanner lines in the foveal region, the resolution can be further increased. When the foveal imagery is produced only with the foveal scanner, the peripheral scanner may be instructed to display nothing in the foveal zone.

In cases where the total display field of view is very large, it may be noted that it is not necessarily desirable to provide foveal resolution capability over the entire peripheral field of view. This is because the human eye typically does not look more than ±20° from straight ahead. In fact it is difficult to do so. Instead people turn their heads to look at objects more than 20° from a straight ahead gaze. Therefore, if for instance a display offers a total horizontal field of view of 120° (±60°), one may only need to supply foveal resolution over the center 50° (±25°) field of view. The horizontal field of view beyond ±25° is then always dedicated to peripheral vision. In this manner the horizontal foveal resolution can be increased over what is possible if the foveal scanner horizontal scan lines had to instead cover the entire field of view.

Rugate Coatings for Augmented Reality

In the augmented reality or see-through mode of the display, it is desirable that the primary "mirror" in front of the eye have excellent transmission yet reflect the laser beams generating the overlaid imagery. Rugate coatings are optical surface coatings in which the index of refraction of the applied layers is made to vary in a continuous fashion. Their advantage is in the creation of reflectors with very high optical density but extremely narrow bandwidth. Hence, a substrate with a rugate coatings may appear crystal clear and have 90% transmission, yet totally reflect laser beams at several chosen wavelengths. Rugate coatings are therefore ideal for an augmented reality retinal scanning display. Three-color rugate coatings have already been deposited on curved substrates for use with light emitting diode driven heads-up displays and have demonstrated 80 percent see-through transmission. The current application utilizes lasers with narrower bandwidth, which permits designs with greater see-through transmission, and even greater optical density at the reflected wavelengths.

In a preferred embodiment, the primary mirror in front of the eye is comprised of polycarbonate plastic. Polycarbonate plastic has unsurpassed impact resistance and is utilized in almost all safety glasses for this reason. Fortunately, polycarbonate is a standard optical plastic widely used in the ophthalmic industry. Machining and polishing of polycarbonate to optical tolerances is widely available. Anti-reflection coatings and hard-coats are readily available and inexpensive.

Focus Adjuster

There are several good reasons for incorporating a focus adjuster in head mounted displays. In augmented reality, the display overlay should be in focus with the background image, so that both can be visualized simultaneously. A display that only focuses at infinity will be of little use when viewing closer objects and will prove annoying in those situations. In both augmented reality (see-through mode) and virtual reality (occluded mode) visual clues relating to depth must agree to prevent the nausea often referred to as simulator sickness. Typically to obtain three dimensional images, the retinal disparity is provided, but not the correct focus corresponding to the vergence. In cases of large motion in depth, a significant number of individuals will eventually experience nausea when only retinal disparity is provided to indicate range. It has been proposed that this is due to an evolutionary adaptation in which the brain decides that the only way such conflicting signals can arrive at the brain is if a dangerous substance has been consumed. Consequently an urge to throw up (nausea) is generated. The solution to all of the above issues is to include a focus adjuster in the display so that the display overlay is in focus with the background objects being viewed (augmented reality mode) and so that vergence and focus depth cues agree (both modes).

In augmented reality mode, the display overlay should be in focus with the current object being viewed. The simplest implementation is to have the entire display at the same focus, which may change with time as the wearer focuses on different objects in the field of view. What is required is a method of determining the focus of the eye, so that the display can match it.

In virtual reality mode, the object currently being viewed with foveal vision should be displayed with a focus appropriate to its depth. Other objects need not have a focus appropriate to their depth since they are not currently being looked at with foveal vision. Hence the display device could simply provide a constant focus for the entire current image that is appropriate to the object in the image currently being gazed at. If one did not know which pixel corresponds to the center of the visual field, the defocus of all pixels would have to be corrected in real time. This would be practically impossible due to the enormous bandwidth required for the focus adjuster. However, the Applicant's head mounted display includes eye tracking to achieve foveation. As such it will be known where the wearer is looking and the focus can be adjusted so that the primary object being looked at has a focus appropriate to its depth. The focus adjuster need only keep up with the accommodation of the eye. In the Applicants head mounted display, an adjustment of several diopters could utilize up to half second and still keep up with the fastest accommodating eyes. The proposed focusing technology is, however, much faster than the requirement.

LensVector, Inc. based in Mountain View, Calif. has developed and is marketing an electronically addressable variable lens for use in products such as cell phones. The base technology involves liquid crystals and optical power change is induced with changes in voltage. The liquid crystal layers are thin, and two such layers are utilized, one for each orthogonal polarization. The external transmission is 90%. Their standard lens is 4.5 mm×4.5 mm×0.5 mm and weighs 22 mg. The driver can be reduced to 2.1 mm×1.4 mm×0.2 mm. The driver utilizes only cell phone voltages. The driver automatically compensates for variations in components and environmental conditions. The lens requires less than half the power of mechanical alternatives in cameras. There are no macroscopic moving parts. Only the liquid crystal molecules move, so the device is silent. The standard lens is designed to vary focus from infinity to 10 cm, a range of 10 diopters. This range of focus is more than adequate for the head mounted display application. Unpowered the device is essentially a sheet of glass and has no optical power. The transition is faster in one direction than the other. The time to change focus 1-diopter is of the order of a few tens of milliseconds in one direction and a few milliseconds in the other direction. The entire 10-diopter range can be scanned on the order of a second. The standard aperture is actually larger than required in the head mounted display application, and smaller apertures can change focus faster than larger apertures. The LensVector variable lens is being mass produced for use in cell phones, and as such is a relatively low cost component. Another potential small, low-cost focus adjuster solution is the adjustable focus lenses of the type described in U.S. Pat. Nos. 7,232,217 and 7,338,159 (which are incorporated herein by reference) awarded to Spivey. These lenses each includes two lens elements having special surfaces such that an adjustment of the position of one of the two lenses relative to the other in a direction perpendicular to the viewing direction will produce a change in focus.

Figure 12:
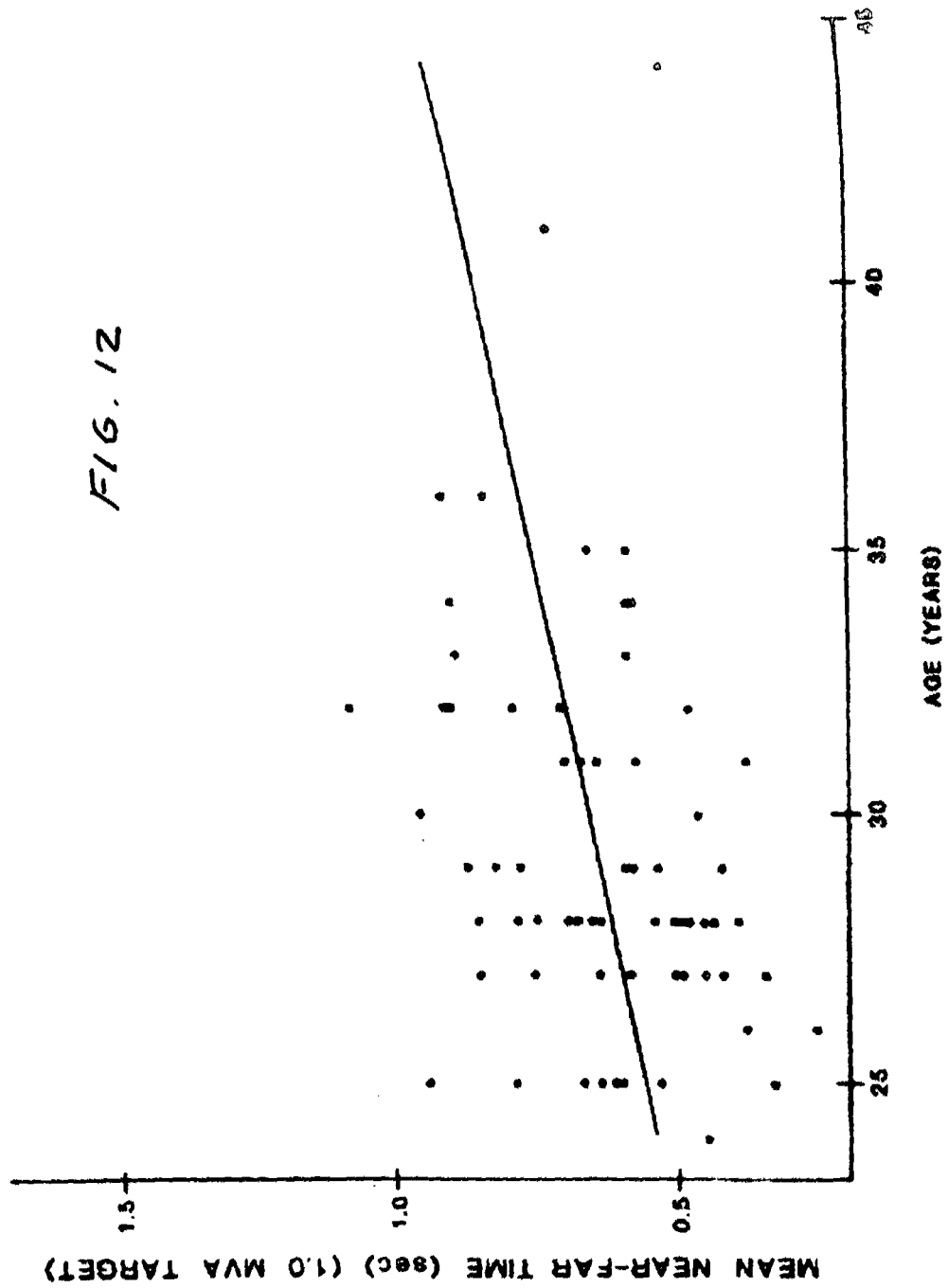
FIG. 12 is a prior art chart showing the time required to change focus from near to far as a function of age.

In the Applicant's head mounted display, the focus adjuster has to be fast enough to keep up with the eye. Accommodation changes are actually quite slow compared to video rates, and therefore the defocus adjuster is not required to have a high bandwidth. It just has to be compact and power efficient. How fast can a person accommodate? The following data is from "The Time Required for U.S. Navy fighter Pilots to Shift Gaze and Identify Near and Far Targets", Ailene Morris and Leonard Temme, Aviation, Space and Environmental medicine, Vol 60, (November 1989) pp. 1085-1089. In this study, subjects were required to recognize the orientation of a Landolt C optotype at 20/20 resolution, both at 18 inches and then at 18 feet. The minimum time for the pair of optotypes to be correctly recognized in succession was measured. A plot of the results is shown in FIG. 12. The minimum average time exceeds 500 msec for the youngest and fastest accommodating subjects. Other studies such as "Age, degraded viewing environments, and the speed of accommodation", Charles Elworth, Clarence Larry, Frederick Malmstrom, Aviation, Space and Environmental Medicine, January 1986, pp. 54-58 have measured much longer times for accommodation. By comparison, the pixel dwell times for WVGA at 60 Hz update are of the order of 15 nsec. If the focus adjuster had to operate at the pixel time scale, the task would nearly be impossible. In the Applicant's head mounted display, adjustment of several diopters can utilize a half second and still keep up with the fastest accommodating eyes.

Methods of Auto-Refraction

In augmented reality mode, the focus of the overlay display should match the current focus of the wearer. Therefore methods are required to determine the current focus of the wearer, or in optometrist language, refract the wearer. The Applicants propose two different methods to accomplish this.

Method #1

Figure 13:
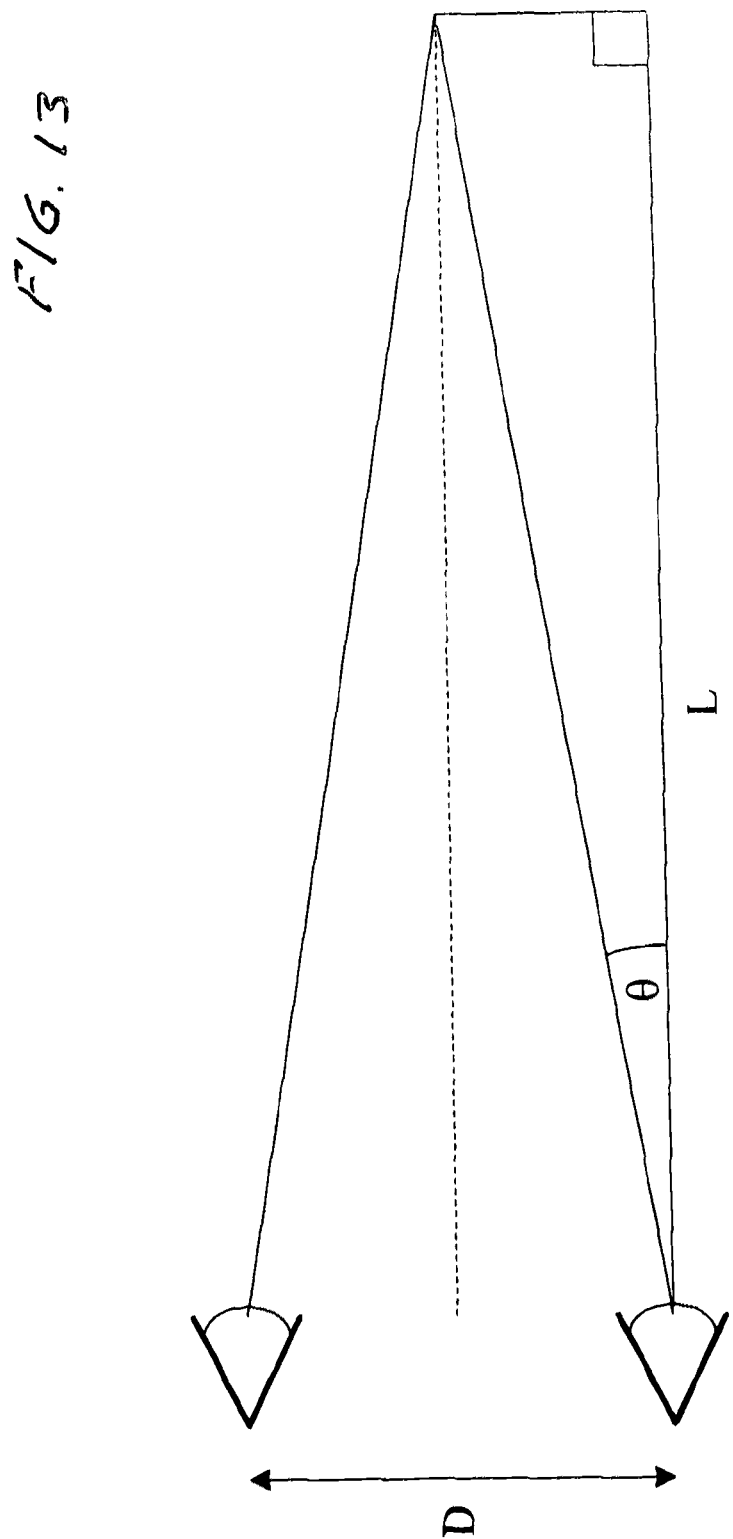
FIG. 13 demonstrates one method of determining the correct focus of the display, by determining how far away the two eyes are pointing FIGS. 14, 15A, 15B and 15C demonstrate the effects of various focal states of the on retro-reflected light.

In the first method, the convergence of the two eyes is measured. By examining the pointing of the two eyes, it is possible to determine how far away they are looking and to then set the focus appropriately. In binocular mode with dual eye-trackers, the convergence can be directly calculated and the defocus adjusted accordingly. In other words, using the proposed eye tracking, the gaze angle of each eye will be known. Therefore the distance of the object being viewed can be calculated using trigonometry. The necessary defocus can then also be calculated and subsequently implemented in the display. Referring to FIG. 13, the relationship between the gaze angles and the distance to the object being viewed for the simple case of looking straight ahead is given by:

$$\tan(\theta) = \frac{D}{2L} \qquad (0.1)$$

Hence if the uncertainty in the gaze angle $\theta$ is given by $\delta\theta$, the uncertainty in the vergence (1/L) is given by:

$$\delta\left(\frac{1}{L}\right) \approx \frac{2}{D} \cdot \frac{\delta\theta}{\cos^2(\theta)} \qquad (0.2)$$

The inter-ocular distance D is approximately 6.5 cm, so for most object distances L, the following approximation can be made:

$$\cdot \cos(\theta) = \frac{L}{\sqrt{L^2 + (D/2)^2}} \approx 1 \qquad (0.3)$$

Hence the uncertainty in vergence is given by:

$$\delta\left(\frac{1}{L}\right) \approx \frac{2}{D} \cdot \delta\theta \qquad (0.4)$$

If L and D are given in meters, then the uncertainty in vergence $\delta(1/L)$ is given in diopters. For an inter-ocular distance D equal to 0.065 m and for $\delta\theta$ equal to half a degree (typical conventional eye tracking accuracy), the uncertainty in vergence is approximately 0.25 diopters. For $\delta\theta$ equal to 0.1° (roughly the best conventional eye tracking) the uncertainty in vergence is about 0.05 diopters. Spectacles are typically prescribed with 0.25-diopter accuracy. With good eye tracking accuracy, the uncertainty in vergence is negligible.

Method #2

The second method of determining the focus of the wearer is to vary the defocus adjuster performing a search so as to maximize the eye-tracking retro-reflection signal. In this manner the eye tracker could simultaneously auto-refract the eye, maximize the eye-tracking signal and automatically focus the display at the plane of the objects currently being viewed.

Figure 14:
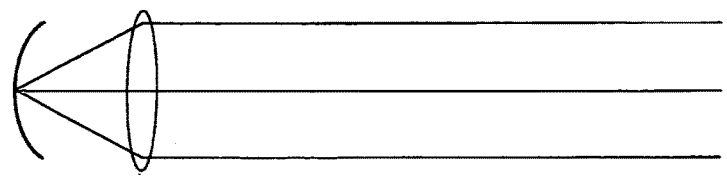
Figure 15A:
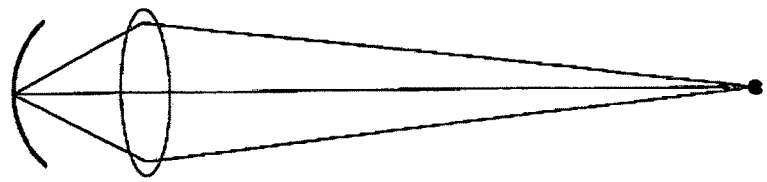
Figure 15B:
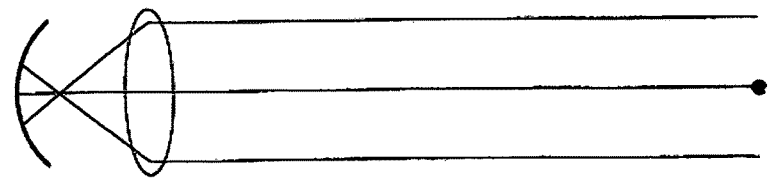
Figure 15C:
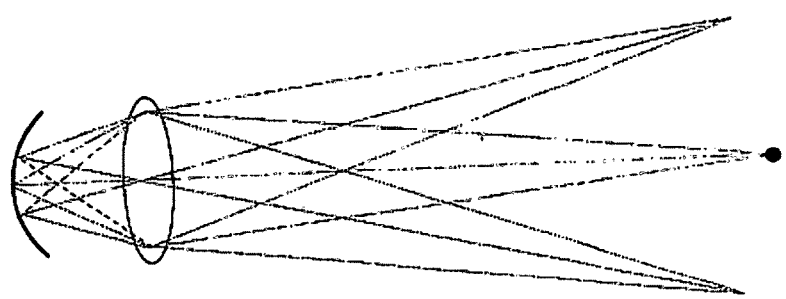

FIG. 14 schematically depicts the situation when the eye is focused at infinity, and collimated light is incident upon the eye. The collimated light is focused to a point on the retina. Any light reflected from the retina is retro-reflected due the reversibility of the geometric light paths. FIGS. 15A, 15B and 15C schematically illustrates what happens when collimated light is incident upon the eye, but the eye is focused not at infinity, but instead upon a closer object as shown in FIG. 15A. In this case the collimated beam is defocused upon the retina and illuminates a larger region as shown in FIG. 15B. Reflected light from each illuminated spot on the retina produces an optical path such as those illustrated in FIG. 15C. Most of these paths do not constitute a retro-reflection. The consequence of this is that the retro-reflected light collection efficiency is significantly diminished.

If a focus adjuster were included in the system, the retro-reflected light signal would be maximized when the eye-tracking probe light was incident upon the eye with the same divergence as from a point on the object being viewed. Hence, by varying the focus adjuster to maintain maximum retro-reflection signal level, the associated display would be kept in focus with the real objects that the eyes are currently viewing.

FIGS. 16A and 16B illustrate a system view. In FIG. 16A the eye is looking through the primary mirror and is focused upon a point on a real object closer than infinity. Consequently the light from this object that enters the eye is more divergent than it would be if the object were a considerable distance away. When the display illumination is given the identical divergence as light from the external point being viewed then both the external point and the display light will be simultaneously in focus on the retina. The colored display illumination and infrared probe light have identical divergence because they share the same optical path and are both affected equally by the focus adjuster. In practice, the divergence of the output of the infrared laser is slightly adjusted by using a lens at its output so as to correct for chromatic aberration in the focus adjuster lens. As depicted in FIG. 16B, when the colored display illumination and the infrared probe light are matched to the current focus of the eye, the infrared probe light is efficiently and optimally retro-reflected back down the optical path and the signal at the avalanche photo diode is maximized. Therefore, by adjusting the focus adjuster so as to maximize the avalanche photodiode signal and thus maximize the retro-reflection efficiency, the visible display illumination is automatically forced to be in the same focus as light from whatever external object the eye is currently focused upon. The focus adjuster focusing power is varied periodically to search for and maintain the maximum retro-reflection signal through the use of an algorithm such as a gradient ascent algorithm.

Electronics Implementation

Applicants have determined that required software and processing power can be implemented using a field programmable gate array (FPGA) and eventually an application specific integrated circuit (ASIC). These devices are compact, lightweight and have power requirements compatible with portability.

Head Tracking

To provide maximum utility in both augmented reality and virtual reality modes, the displayed image should have the capability to move in response to head motion. For instance, the wearer in virtual reality mode could turn their head to view new portions of the surrounding scene. A wearer in augmented reality mode could turn their head and obtain augmented reality overlays appropriate to other objects in their surrounding environment. This is possible with display orientation tracking. Using a MEMS gyro sensor such as that available in the Wii Motion Plus devices, such tracking may be possible at a reasonable cost. Certainly for military training or gaming in an occluded mode, this would be a significant and useful advance in hardware capability. For augmented reality, the displayed image must move with head motion to maintain correspondence with the real world. Image processing algorithms will be required to shift the overall scene to correspond to the current display and head orientation. In an embodiment of the Applicant's device, MEMS gyros are incorporated into the head-mounted display so that head orientation tracking can be implemented.

Size, Weight and Power Requirements

Preferred embodiments of the present invention can be produced in both a monocular and a binocular version. A version useful for deployment in the military would probably have to fit over corrective eyewear, although a spectacle prescription could be implemented directly in the display lenses themselves.

The anticipated size and weight of the head mounted component of the proposed device is similar to that of a pair of safety goggles. The device described in William Schonlau and referred to in the Background section of this specification has such a format. As indicated that device was described in "Personal Viewer; a wide field, low profile, see-through eyewear display", SPIE Vol. 5443, 2004 and "Immersive Viewing Engine", SPIE Vol. 6224, 2006. This device is retinal scanning display based head mounted display with a curved primary mirror in front of the eye. However, the author did not have an adequate solution to the problem of aberrations due to the curved mirror, did not implement any scheme to achieve foveation, he did not present a scheme for eye tacking required for foveation, and he did not present a scheme for varying the focus of the display.

Preferred embodiments could include a second electronics component that could be connected to the head mounted component either wirelessly or with a wire. The second component could be a belt-mounted unit. It could also be incorporated into the console of a television set or gaming console. The size and weight of the belt mounted unit are expected to be similar but slightly larger than a pico laser projection display unit, which incorporates image processing electronics and a battery power supply in addition to a laser scanning projector with power adequate for projection on a wall. Dramatically less laser power is required for the head mounted display. The pico display unit weighs 122 grams and has overall dimensions of 14 mm×60 mm×118 mm.

Estimates of power consumption depend upon the level of development of the product. Demonstration prototypes consume significantly more power because the processing is not implemented in energy efficient ASIC chips. Applicants estimate power consumption for the preferred embodiment described in FIG. 2C as follows:

Foveal scanner prototype 1.0 W, product 0.6 W
Peripheral scanner prototype 1.8 W, product 0.8 W
Wavefront coding processing 3 W with standalone NVIDIA, 450 mW with FPGA/ASIC
Eye-tracking processing 3 W with standalone NVIDIA, 300 mW with FPGA/ASIC
Foveation processing 2 W with standalone NVIDIA, 100 mW with FPGA/ASIC
Eye-tracking laser & APD 5 mW The total estimate is a peak power consumption of 11 W per eye for the demonstration prototype, and 2.3 W per eye for a product with the electronic processing implemented in ASICs.

Many tricks may be possible to further reduce power consumption. For instance, the scanners need operate only when there is information to be displayed. Due to the eye tracking, it will always be known where the eye is looking. Most of the time the wearer will typically look through the center portion of the primary mirror in front of the eye where aberrations are low and aberration correction may not be required. If the wavefront coding was turned on only when it was required, power savings would be significant. This would require a removable phase plate or an electronically programmable phase plate. Such devices exist and are being developed. Another idea is to consider the resolution requirements of a displayed image. If only lower resolution is required, then the wavefront coding resolution enhancement may temporarily not be required. In fact the foveation itself could be temporarily turned off if the required display resolution is low.

Prototype System

Thus, a prototype system designed by Applicants provides the following attributes:
Exceptionally high resolution where the wearer is looking (20/20 vision in one preferred embodiment)
Appropriately reduced resolution for peripheral vision to utilize a manageable bandwidth
Wide display field of view (such as 50°×70°) in one preferred embodiment)
Wide, unimpeded see-through field of view with excellent transmission in augmented reality mode
Extraordinary color rendition
Sufficient brightness for use in bright sunlight in augmented reality mode
Undetectable light leakage for covertness in augmented reality mode
Protects the eyes by providing unsurpassed impact resistance
Minimal size, weight, and power requirements
Can provide full 3D imagery with correct focus cues in addition to retinal disparity cues
In augmented reality mode automatically focuses the displayed imagery at the same depth as objects currently being viewed by the wearer Subsidiary Advantages of the Present Invention The proposed head mounted display offers a number of subsidiary advantages, some of which are listed in the following:
Laser Eye Protection—
In augmented reality mode, the rugate coatings on the primary mirror in front of the eyes also provide laser eye protection for the wavelengths utilized in the display. The rugate stack could be augmented to include other wavelengths known to present a danger.
Verification of Identity—
The eye-tracking scanner records the structure of the retina on top of the overall retro-reflection pattern, much as a scanning laser ophthalmoscope would do, and can be used to verify identity.
Detection of Certain Medical Conditions—
The eye-tracking data could be used to monitor a number of health related issues. For instance, by examining the retro-reflection levels of the various colors used in the display, the oxygen saturation could be easily determined and monitored.

Detection of fatigue or incapacitation—
When a person is about to fall asleep, the pupil of the eye begins to fluctuate in size. This modulation will be recorded by the eye-tracking software and could be used to alert the user or command structure. If a pilot were to black out due to g-forces, the eye tracking system would detect the signature and the plane could be instructed to go to autopilot, saving both the plane and the pilot.
Communication Via Eye Movements or Blinking—
The eye tracking system could be utilized as a secondary communication system. For instance, if the user was injured but conscious, they could blink their eyes in some prearranged code to inform the command system via the eye tracking system. The wearer could operate machinery in this manner.
Determination of Alertness and Effort—
The harder people think, the larger their pupils become. If searching for a target, when the target is located, the pupils will momentarily enlarge. There is a lot of information that can be ascertained by observing the wearer's eyes with the eye tracking system.

Variations

Although the present invention has been described in terms of certain preferred embodiments, persons skilled in the art of head mounted displays will recognize that there are many changes and variations that could be applied within the general concepts of the invention. For example: the curved primary mirror in front of the eye could be implemented on a helmet mounted visor. The curved primary mirror in front of the eye need not be directly head mounted. The curved primary mirror in front of the eye could be implemented on an aircraft cockpit window. The curved primary mirror in front of the eye could be implemented on an automobile window. The retinal scanning technology does not require lasers. Super luminescent diodes (SLDs) and light emitting diodes (LEDs) could be utilized in place of lasers, for example. Three visible lasers are only required for full color displays. A single laser is adequate for a monochrome display. More than three visible lasers can be utilized to further increase the color gamut possible, providing more colors than most people would have a chance to see in any other manner. All aspects described in this document need not be simultaneously implemented. For instance, the curved mirror in front of the eye may be utilized with wavefront coding for aberration correction. However, foveation and the associated eye tracking may not be implemented if the resolution and field of view do not require it.

Therefore the reader should determine the scope of the invention by the appended claims and not the specific examples that have been given.

We claim:

1. A head mounted display system comprising at least one retinal display unit said at least one display unit comprising:
   A) a curved reflector and a frame adapted to position the curved reflector in front of at least one eye of a wearer, said at least one eye defining a pupil, a retina, a fovea and a view direction,
   B) a first set of at least three visible light lasers, all lasers being co-aligned and adapted to provide a co-aligned, color foveal laser beam,
   C) a second set of at least three visible light lasers plus an infrared laser, all lasers being co-aligned and adapted to provide a co-aligned, color and infrared retinal laser beam, D) a first two dimensional MEMS laser scanner unit adapted to provide both horizontal and vertical scanning of the co-aligned color laser beam across a portion of the curved reflector in directions so as to produce reflections of the horizontally and vertically scanned color foveal laser beam through the pupil of the eye onto a small portion of the retina, said small portion being less than 20 percent of the retina but large enough to encompass the fovea, said small portion defining a foveal region, E) a second two dimensional MEMS laser scanner unit adapted to provide both horizontal and vertical scanning of the co-aligned color and infrared laser beam across a portion of said curved reflector in directions so as to produce a reflection of the horizontally and vertically scanned color and infrared retinal laser beam through the pupil of the same eye onto a portion of retina corresponding to a field of view of at least 30 degrees×30 degrees, F) an infrared light detector adapted to detect infrared light reflected from the retina and the curved reflector and produce an infrared reflection signal, G) a video graphics input device adapted to provide color video graphics input signals, H) control electronics adapted to:
 1) determine the view direction of the eye based on the infrared reflection signal,
 2) modulate the first set of three visible light lasers based on the video graphics input signals and control the first scanner unit based on the infrared reflection signal to produce, with the scanned foveal laser beam, color images on the foveal region of the eye, and
 3) modulate the second set of three visible light lasers based on the video graphics input signals and control the second scanner unit based on the infrared reflection signal to produce, with the retinal color and infrared laser beam:
  a) color images on a region of the retina corresponding to a field of view of at least 30 degrees×30 degrees and
  b) infrared reflected light for determining the eye view direction wherein the first scanner unit is adapted to produce a relatively high resolution image on the fovea region of the user's eye and the second scanner unit is adapted to produce a substantially larger image on a portion of the user's eye providing the user a high resolution image of objects within less than 20 degrees of the center of his field of view and an overall field of view of at least 30 degrees.

2. The display system as in claim 1 wherein the curved mirror is spherical.

3. The display system as in claim 1 wherein the curved mirror is ellipsoidal.

4. The display system as in claim 1 wherein each of the first and second sets of at least three visible light lasers comprise red, green and blue lasers.

5. The display system as in claim 1 wherein each of the first and second sets of at least three visible light lasers is a set made up of a red, a green and a blue laser.

6. The display system as in claim 1 wherein a horizontal scan for each of the first and second MEMS scanners is provided by the resonant scanner and vertical scans are provided by a ramping voltage applied with respect to one axis of the scanner.

7. The display system as in claim 1 wherein the foveal region corresponds to an approximately 10 degree diameter field of view encompassing the fovea.

8. The display system as in claim 1 wherein the second scanner unit is adapted to provide a reflection on the retina corresponding to a field of view of about 50 degrees×70 degrees.

9. The display system as in claim 1 wherein the second scanner unit is adapted to provide a reflection on the retina corresponding to a field of view of having one dimension as large as 120 degrees.

10. The display system as in claim 1 wherein said at least one retina display unit is two retina display units and said at least one eye is both of the wearer's two eyes.

11. The display system as in claim 10 wherein said display further comprises focus adjuster elements.

12. The display system as in claim 11 wherein the focus adjuster elements comprise a variable focus lens and feedback electronics adapted to adjust focus of the variable focus lens to maximize reflection of infrared light detected by said infrared detector of each of the two retinal display units.

13. The display system as in claim 11 wherein the focus adjuster elements comprise a variable focus lens and feedback electronics adapted to adjust focus of the variable focus lens and said control electronics are adapted to determine the focus of each of the two eyes by estimating the convergence angle of the two eyes.

14. The display system as in claim 10 wherein the system is adapted to provide three dimensional viewing.

15. The display system as in claim 14 wherein the system includes a wireless connection to a communication consol.

16. The display system as in claim 15 wherein the consol is a television consol.

17. The display system as in claim 15 wherein the consol is a computer consol in communication with the Internet.

18. The display system as in claim 15 wherein said system is adapted for computer gaming.

19. The display system as in claim 1 wherein the system is adapted for operation in a virtual reality mode.

20. The display system as in claim 1 wherein the system is adapted for operation in an augmented reality mode.

21. The display as in claim 1 wherein the curved mirror has a varying radius of curvature.

22. The display system as in claim 1 wherein the system is adapted for implementation in the form of goggles.

23. The display system as in claim 1 wherein the system is adapted for implementation in the form of a head mounted visor.

24. The display system as in claim 1 wherein the system is adapted for implementation in a form wherein the curved reflector is a portion of a cockpit window.

25. The display system as in claim 1 wherein the system is adapted for implementation in a form wherein the curved reflector is a portion of a motor vehicle window.

* * * * *